G. Finnegan,
Band Saw Mill.

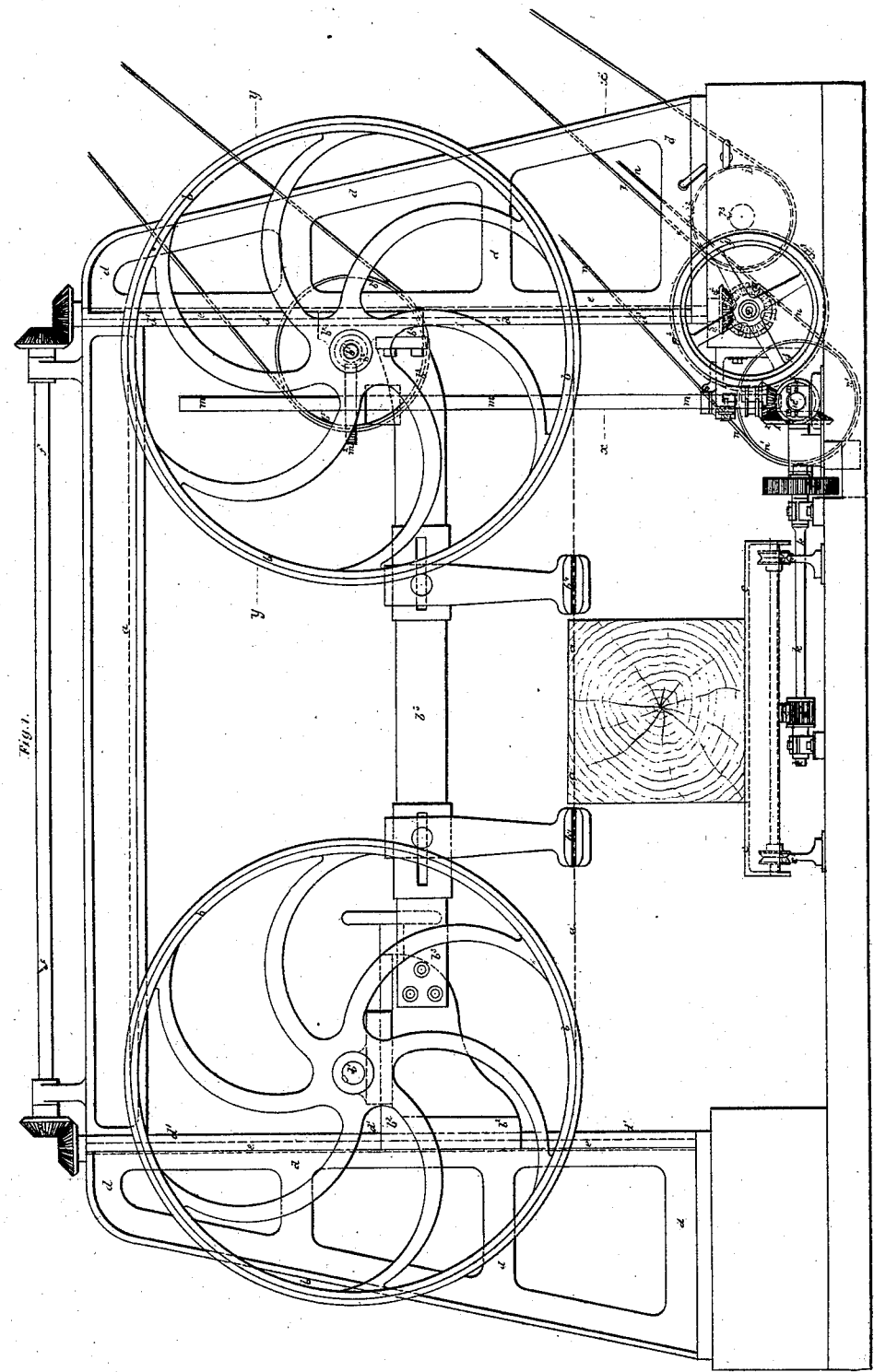

No. 113,412. Patented Apr. 4, 1871.

Witnesses
Francis Meehan
Sam'l Blair

Inventor
George Finnegan

N. PETERS, PHOTO-LITHOGRAPHER, WASHINGTON, D. C.

United States Patent Office.

GEORGE FINNEGAN, OF DUBLIN, IRELAND.

Letters Patent No. 113,412, dated April 4, 1871.

IMPROVEMENT IN SAW-MILLS.

The Schedule referred to in these Letters Patent and making part of the same.

*To all whom it may concern:*

Be it known that I, GEORGE FINNEGAN, of Dublin, Ireland, have invented certain new and useful "Improvements in Band-Saw Machines;" and I do hereby declare that the following is a full and exact description thereof, reference being had to the accompanying drawing forming a part of this specification.

This invention relates to an improved arrangement of a band-sawing machine, adapted more especially for the purpose of "opening" large logs of round or square timber, and of cutting them up into boards and planks of any thickness required.

My improvements consist in mounting the band-saw upon two rollers revolving on horizontal axes, the pulleys or rollers being placed on opposite sides of the machine and at the same level or elevation, one pulley being on each side of the traveling-table which carries the log or timber to be cut.

By this arrangement the endless-saw, as it passes from one pulley to the other, will not only travel horizontally, but will also cut the timber in a lateral or horizontal direction.

I mount the rollers in suitable bearings, which are capable of sliding vertically in or upon the standards or framing of the machine, and which may be fixed at any desired height therein, so as to render them capable of adjustment to the timber to be cut.

The timber may be supported in any suitable manner; but I prefer to fix it by "dogs" to a table provided with rollers capable of running upon suitable rails.

I give motion to the band-saw, as heretofore, by a strap or band passing around a pulley fixed on the axis of one of the drums or rollers around which the band-saw is strained, and I take up the slack of such driving-strap or band by means of a weighted roller or other equivalent compensating mechanism.

By these means I am enabled readily to adjust the saw to the timber, and to fix the latter to the top of a solid table or bench capable of traveling in a horizontal plane, while I am enabled also to dispense with the cellar or space which is often required underneath band-saw machines as heretofore constructed.

In order that my said invention may be more fully understood and readily carried into effect, I will proceed, aided by the accompanying drawing, more fully to describe the same.

Description of the Drawing.

Figure 1 is an elevation of a band-saw machine constructed according to my invention.

Like letters indicate the same parts throughout the drawing.

Figure 3:
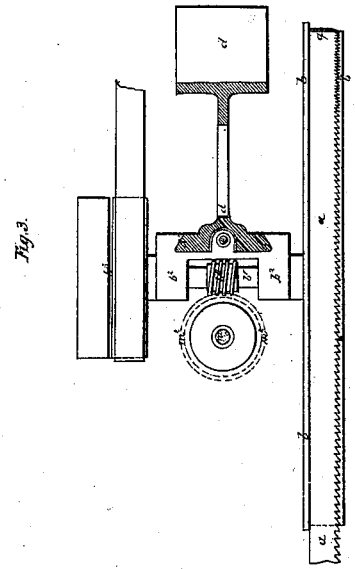
Figure 3 is a horizontal section on the line $y\,y$, fig. 1.

The band-saw $a$ is mounted upon rollers $b$, placed on opposite sides of the machine, and mounted on horizontal axes $b^1$, so as to cause the saw to cut in a horizontal plane.

The timber to be cut is supported upon the traveling bed or table $c$, upon which it is fixed by dogs or other equivalent devices.

The axes $b^1$ are carried in bearings $b^2$, which are capable of sliding upon V-pieces $d'$, formed on the standards or frames $d$.

The bearings $b^2$ are connected together by a crossbar or frame, $b^3$, having two guides or supports, $b^4$, fixed thereto to guide and support the band-saw $a$ close to its work.

Motion is given to the band-saw $a$ by means of a pulley, $b^5$, mounted on one of the axes $b^1$; and I adjust the saw to its work by means of screws $e$, which take into suitable nuts formed in or carried by the bearings $b^2$, such screws $e$ being geared together by beveled pinions $f$ fixed on the shaft or axis $f$, and taking into beveled pinions $e^1$ fixed on the upper ends of the screws $e$.

In order to lower the saw I give motion to the screws $e$ by means of a hand-wheel, $g^1$, fixed on an axis, $g$, which also carries a beveled pinion, $g^2$, the latter taking into a beveled pinion, $e^2$, fixed on the lower end of one of the screws $e$; but when it is desired to raise the saw, for the purpose of fixing a fresh log to the bed or table $c$, I give motion to the shaft or axis $g$ by means of a strap or band, $i$, which, by means of the fork $j$, is shifted from the loose-pulley $i^1$ to the fast-pulley $i^2$, the latter having on its axis a toothed pinion, $i^3$, which takes into and gives motion to a toothed wheel, $g^3$, fixed on the shaft or axis $g$.

If desired, motion may be given to the bed or table $c$ by means of a screw driven by a strap or band passing around a cone-pulley fixed thereon; but if so, provision must be made to stop the table $c$ simultaneously with the saw, if from any cause the latter should cease running.

The mode, however, of giving motion to the bed $c$ which I have found to answer well is that shown in the drawing, and the following is a description of the same:

The bed or table $c$ is supported by rollers $c^1$, capable of running on fixed rails $c^2$.

On the under side of the bed or table $c$ is fixed a toothed rack, $c^3$, which receives motion from a toothed pinion, $k^1$, fixed on the shaft or axis $k$.

On one end of the latter is fixed a toothed wheel, $k^2$, which is driven by a toothed wheel, $l^1$, fixed on one end of the shaft or axis $l$, whose other end carries a beveled wheel, $l^2$.

When the machine is in the act of sawing, the wheel $l^2$ is driven by a beveled pinion, $m^1$, keyed on the lower end of the shaft or axis $m$.

This shaft or axis $m$ receives motion from a worm or screw, $b^6$, fixed on one of the shafts or axes $b^1$ and taking into a worm-wheel, $m^2$, on the shaft or axis $m$, which wheel may be raised or lowered on the said shaft, while held securely thereon by means of a long key-way, as will be readily understood.

Figure 2:
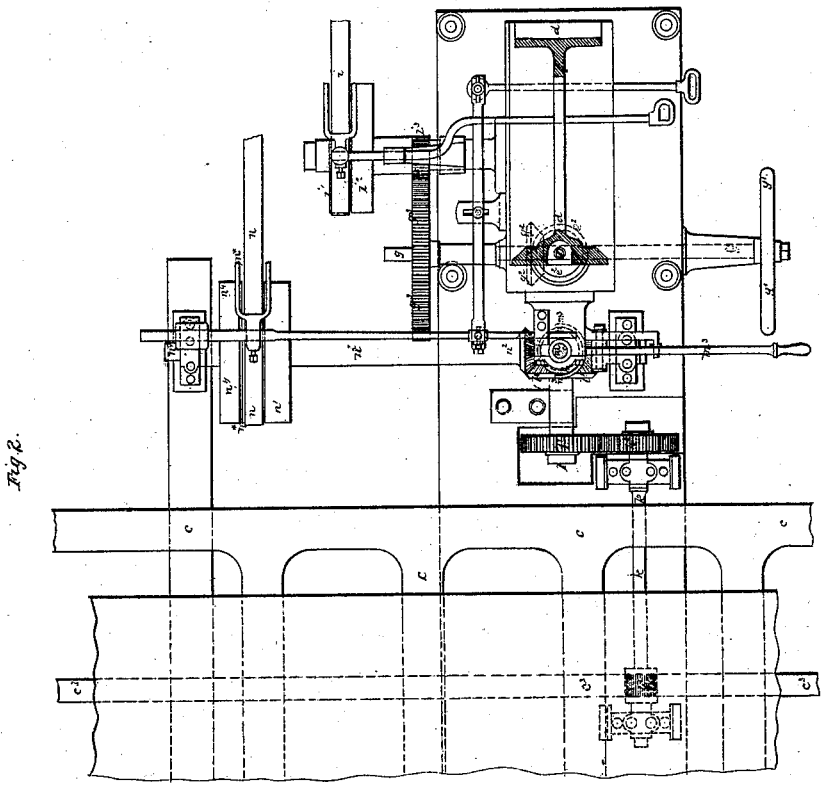
Figure 2 is a horizontal section on the line $x\,x$, fig. 1.

When, however, it is desired to return the bed or table $c$ quickly for a fresh cut, the beveled pinion $m^1$ is taken out of gear with the beveled wheel $l^2$ by means of the clutch-lever $m^3$, (shown in fig. 2.)

The strap or band $n$ is then shifted from the loose-pulley $n^*$ to the driving-pulley $n^1$, fixed on one end of the hollow shaft or axis $n^2$, the other end of which has formed or fixed thereon a beveled pinion, $n^3$, which takes into and gives motion to the beveled wheel $l^2$ on the shaft or axis $l$.

Or if it be desired to run the bed or table $c$ quickly in the opposite direction, then the driving-strap or band is shifted to the driving-pulley $n^4$, fixed on one end of the shaft or axis $n^5$, (passing through the hollow shaft $n^2$,) the other end having fixed thereon the beveled pinion $n^6$, which gives motion to the beveled pinion $l^2$ in the contrary direction.

It will be obvious that, when a quick speed is given to the bed or table $c$ in the direction for cutting, the band-saw will be raised above the timber fixed on the bed or table $c$; and in order to change the speed at which the bed or table $c$ is driven for cutting, I employ change-wheels of suitable sizes to take the places of the toothed wheels $k^2$ and $l^1$, as will be readily understood.

Having thus fully described the nature of my invention and the best mode with which I am acquainted for carrying the same into effect, I would have it understood that I make no claim to the various parts, separately considered; but

What I claim as my invention, and desire to secure by Letters Patent, is—

The band-saw $a$, mounted upon two horizontal rollers, $b$, and arranged in combination with the bed or table $c$, and with the devices for operating or driving the saw and adjusting the same to or away from its work, and with the mechanism for moving the bed or table in either direction, and for varying the speed thereof, all substantially as and for the purpose set forth.

GEORGE FINNEGAN. [L. S.]

Witnesses:
FRANCIS MORGAN, *Solicitor,*
   35 *Dawson Street, Dublin;*
SAML. BLAIR,
   *Clerk to said Francis Morgan.*